(12) United States Patent
Amitai

(10) Patent No.: US 7,724,442 B2
(45) Date of Patent: May 25, 2010

(54) SUBSTRATE-GUIDED OPTICAL DEVICES

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 45 days.

(21) Appl. No.: 10/571,209

(22) PCT Filed: Sep. 9, 2004

(86) PCT No.: PCT/IL2004/000814

§ 371 (c)(1),
(2), (4) Date: Nov. 7, 2006

(87) PCT Pub. No.: WO2005/024969

PCT Pub. Date: Mar. 17, 2005

(65) Prior Publication Data

US 2007/0091445 A1 Apr. 26, 2007

(30) Foreign Application Priority Data

Sep. 10, 2003 (IL) .................................. 157837

(51) Int. Cl.
*G02B 27/14* (2006.01)
(52) U.S. Cl. ..................................... 359/630
(58) Field of Classification Search ................ 359/629, 359/630, 637, 641
See application file for complete search history.

(56) References Cited

U.S. PATENT DOCUMENTS

| 4,805,988 | A | 2/1989 | Dones |
| 5,076,664 | A | 12/1991 | Migozzi |
| 5,353,134 | A | 10/1994 | Michel et al. |
| 5,453,877 | A | 9/1995 | Gerbe et al. |
| 6,091,548 | A * | 7/2000 | Chen ........................... 359/637 |
| 6,388,814 | B2 * | 5/2002 | Tanaka ........................ 359/630 |
| 6,556,282 | B2 * | 4/2003 | Jamieson et al. ........... 356/4.01 |
| 2003/0218718 | A1 | 11/2003 | Moliton et al. |
| 2005/0018308 | A1 * | 1/2005 | Cassarly et al. ............. 359/630 |

FOREIGN PATENT DOCUMENTS

| EP | 0 365 406 | 10/1989 |
| EP | 0 399 865 | 11/1990 |
| EP | 0 543 718 | 12/1996 |
| FR | 2 721 872 | 1/1994 |
| GB | 2 272 980 | 1/1994 |
| WO | WO 98/15868 | * 4/1998 |
| WO | WO 01/95027 | 12/2001 |
| WO | WO 03/081320 | 2/2003 |
| WO | WO 03/058320 | 7/2003 |

* cited by examiner

*Primary Examiner*—Jessica T Stultz
*Assistant Examiner*—Mahidere S Sahle

(57) ABSTRACT

There is provided an optical device, having a light-transmitting substrate (20) having at least two major surfaces parallel to each other and edges; a display light source; optical means for coupling light from the light source into the substrate (20) by internal reflection, and at least one partially reflecting surface (22) located in the substrate (20) which is non-parallel to the major surfaces of the substrate wherein the source emits light waves located in a given field-of-view, that the light waves are collimated, that an angular resolution is defined for the optical device, and wherein the angular deviation between any two different rays located in one of the collimated light waves, is smaller than the angular resolution.

31 Claims, 7 Drawing Sheets

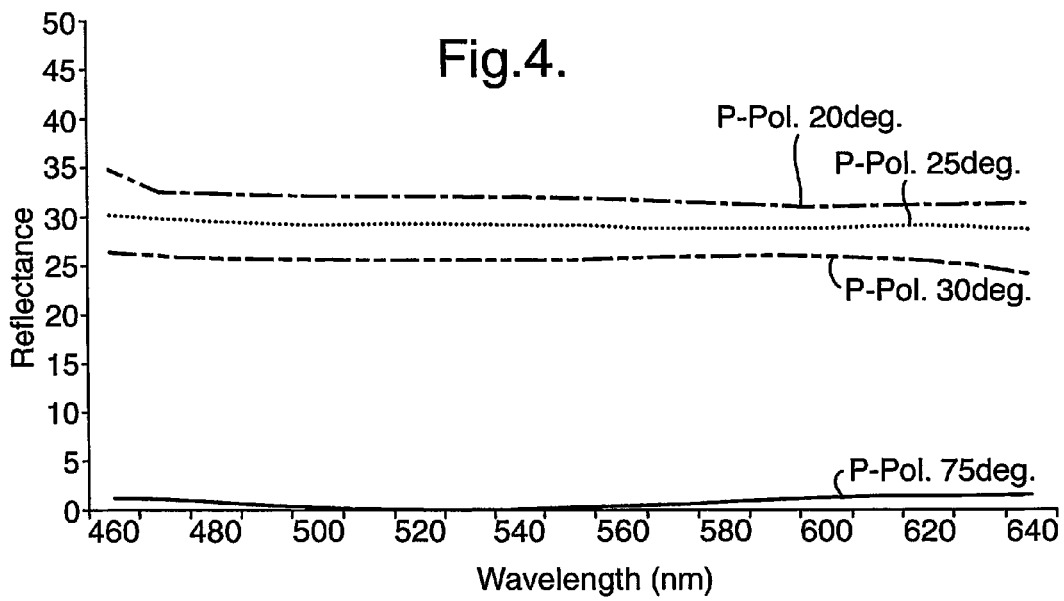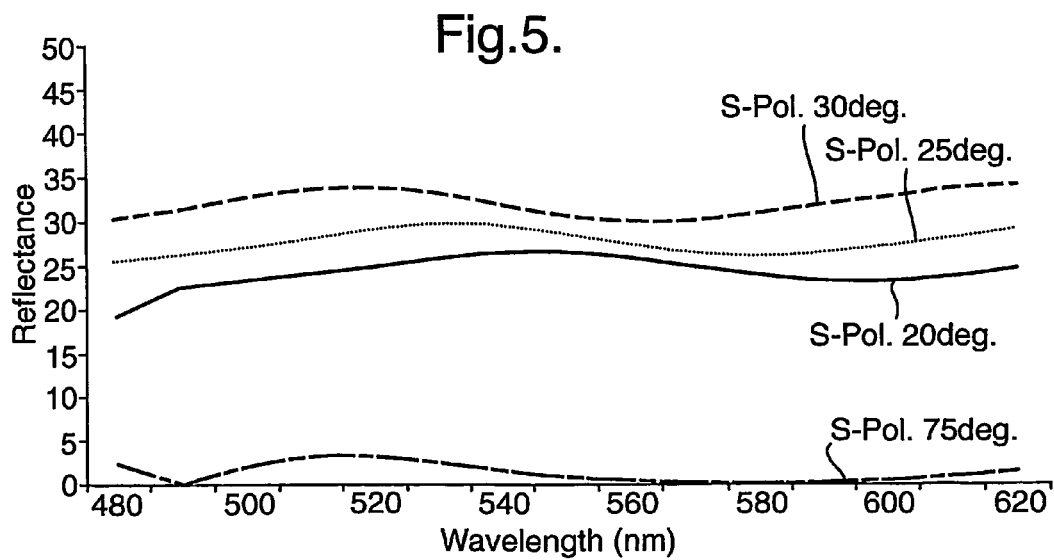

SUBSTRATE-GUIDED OPTICAL DEVICES

The present invention relates to substrate-guided optical devices, and particularly to devices which include a plurality of reflecting surfaces carried by a common light-transmissive substrate, also referred to as a light-guide.

The invention can be implemented to advantage in a large number of imaging applications, such as, for example, head-mounted and head-up displays (HMD's and HUD's), cellular phones, compact displays, 3-D displays, compact beam expanders, as well as non-imaging applications such as flat-panel indicators, compact illuminators and scanners.

BACKGROUND OF THE INVENTION

One of the important applications for compact optical elements is in HMD's wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for moderate performance devices, impractical. This is a major drawback for all kinds of displays but especially in head-mounted applications, wherein the system must necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even to small movements of the optical system relative to the eye of the viewer, and does not allow sufficient pupil motion for conveniently reading text from such displays.

DISCLOSURE OF THE INVENTION

The present invention facilitates the structure and fabrication of very compact light-guide optical elements (LOE) for, amongst other applications, head-mounted displays. The invention allows relatively wide FOV's together with relatively large EMB values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved HUD's. HUD's have become popular and they now play an important role, not only in most modern combat aircrafts, but also in civilian aircrafts, in which HUD systems have become a key component for low-visibility landing operation. Furthermore, there have recently been numerous proposals and designs for HUD's in automotive applications where they can potentially assist the driver in driving and navigation duties. Nevertheless, state-of-the-art HUD's suffer several significant drawbacks. All HUD's of the current designs require a display source that must be offset a significant distance from the combiner to ensure that the source illuminates the entire combiner surface. As a result, the combiner-projector HUD system is necessarily bulky and large, and requires considerable installation space, making it inconvenient for installation and, at times, even unsafe to use. The large optical aperture of conventional HUDs also pose a significant optical design challenge; rendering the HUD's with either a compromising performance, or leading to high cost wherever high-performance is required. The chromatic dispersion of high-quality holographic HUD's is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can readily be installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless Internet-access market, sufficient bandwidth is available for full video transmission. The limiting factor remains the quality of the display within the end-user's device. The mobility requirement restricts the physical size of the displays, and the result is a direct-display with a poor image viewing quality. The present invention enables, a physically very compact display with a very large virtual image. This is a key feature in mobile communications, and especially for mobile Internet access, solving one of the main limitations for its practical implementation. Thereby, the present invention enables the viewing of the digital content of a full format Internet page within a small, hand-held device, such as a cellular phone.

A broad object of the present invention, therefore, is to alleviate the drawbacks of state-of-the-art compact optical display devices and to provide other optical components and systems having improved performance, according to specific requirements.

The invention therefore provides an optical device comprising a light-transmitting substrate having at least two major surfaces parallel to each other and edges; a display light source; optical means for coupling light from the light source into said substrate by internal reflection, and at least one partially reflecting surface located in the substrate which is non-parallel to said major surfaces of the substrate characterized in that said source emits light waves located in a given field-of-view, that said light waves are collimated, that an angular resolution is defined for said optical device, wherein the angular deviation between any two different rays located in one of said collimated light waves, is smaller than said angular resolution.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a prior art folding optical device;

FIG. 2 is a side view of an embodiment of a LOE, in accordance with the present invention;

FIGS. 3A and 3B illustrate the desired reflectance and transmittance characteristics of selectively reflecting surfaces used in the present invention for two ranges of incident angles;

FIG. 4 illustrates the reflectance curves as a function of wavelength for an exemplary dichroic coating for P-polarization;

FIG. 5 illustrates a reflectance curve as a function of wavelength for an exemplary dichroic coating for S-polarization;

FIG. 6 illustrates the reflectance curves as a function of incident angle for an exemplary dichroic coating;

FIG. 7 is a schematic sectional-view of a reflective surface according to the present invention;

FIG. 8 is a diagram illustrating detailed sectional views of an exemplary array of selectively reflective surfaces;

FIG. 9 is a diagram illustrating detailed sectional views of another array of selectively reflective surfaces;

FIG. 10 illustrates detailed sectional views of the reflectance from an exemplary array of selectively reflective surfaces, for three different viewing angles;

FIG. 11 illustrates the reflectance curves as a function of incident angle for two other dichroic coating;

Figure 12:
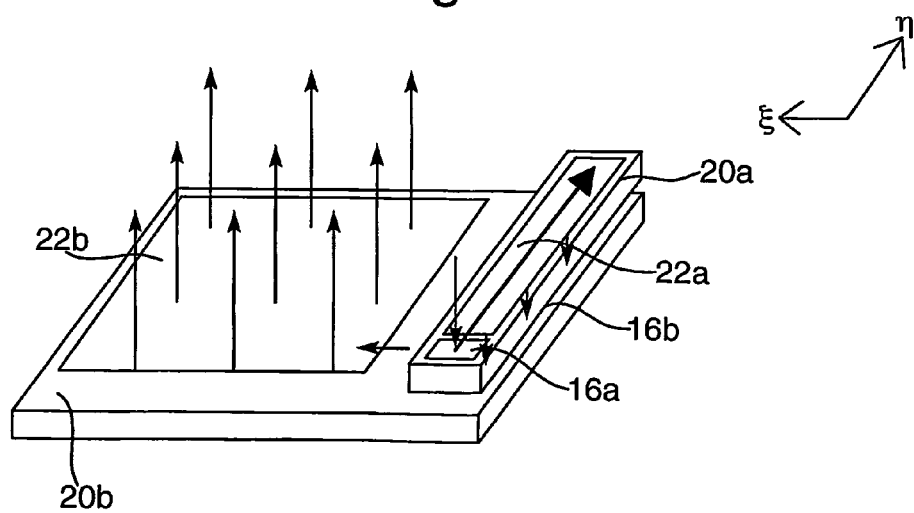
Figure 13:
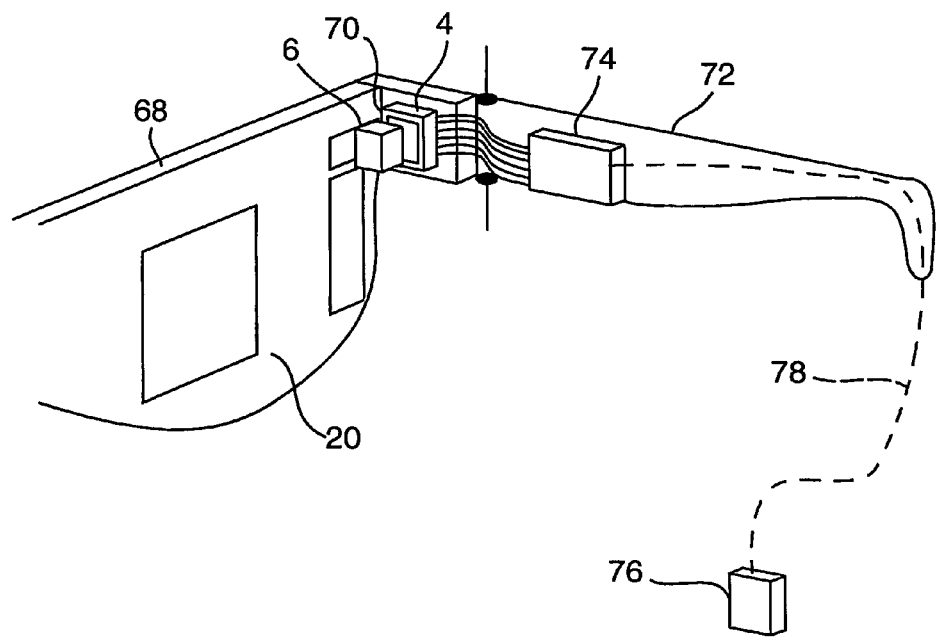
Figure 14:
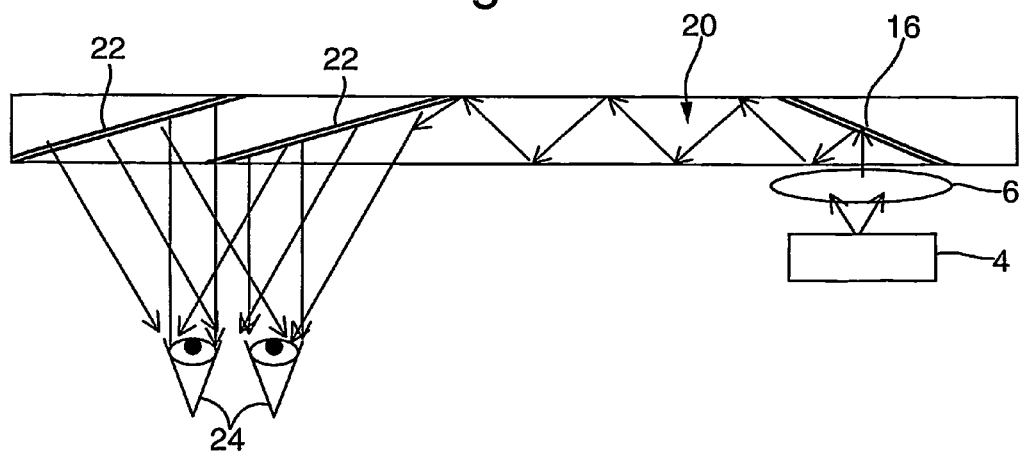
Figure 15:
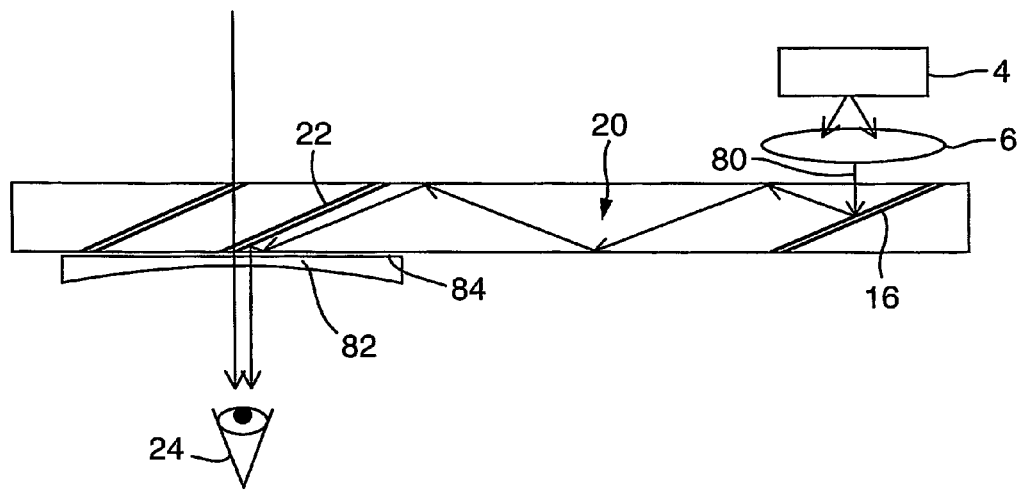
Figure 16:
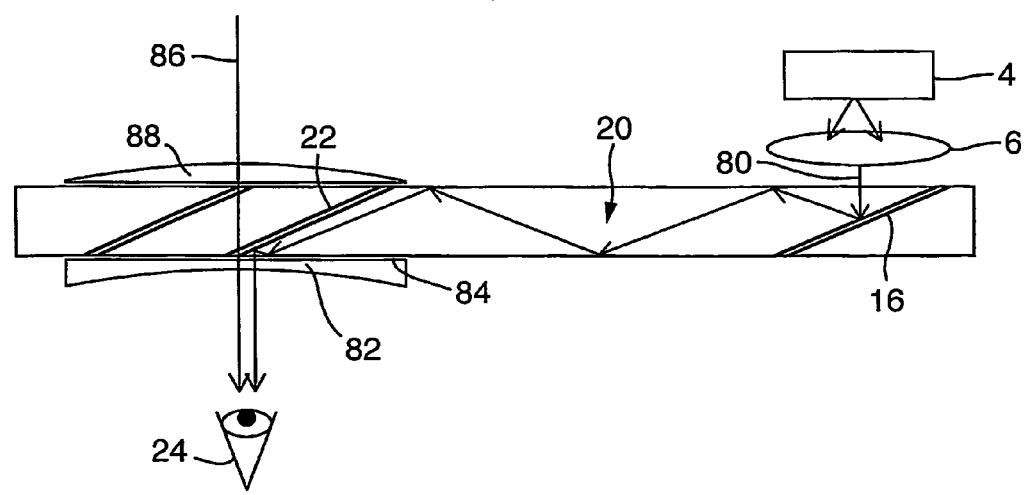

FIG. 12 is a diagram illustrating a method to expand a beam along both axes utilizing a double LOE configuration;

FIG. 13 illustrates an exemplary embodiment of the present invention embedded in a standard eye-glasses frame;

FIG. 14 illustrates an exemplary HUD system in accordance with the present invention;

FIG. 15 illustrates an exemplary embodiment of the present invention wherein a negative lens is attached to the surface the LOE, and FIG. 16 illustrates an exemplary embodiment of the present invention wherein negative and positive lenses are attached to the surfaces the LOE.

DETAILED DESCRIPTION OF PREFERRED EMBODIMENTS

Figure 1:
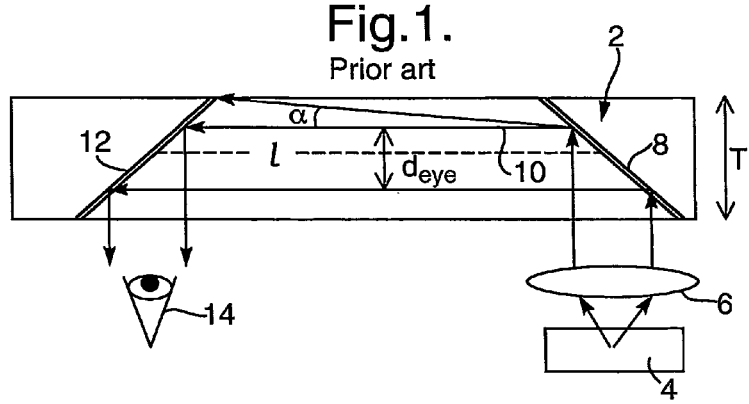

FIG. 1 illustrates a conventional folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye of a viewer 14. Despite the compactness of this configuration, it suffers significant drawbacks; in particular only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein T is the substrate thickness;
$d_{eye}$ is the desired exit-pupil diameter, and
l is the distance between reflecting surfaces 8 and 12.

With angles higher than $\alpha_{max}$ the rays are reflected from the substrate surface before arriving at the reflecting surface 12. Hence, the reflecting surface 12 will be illuminated at an undesired direction and ghost images appear.

Therefore, the maximum achievable FOV with this configuration is:

$$FOV_{max} \approx 2\nu\alpha_{max}, \quad (2)$$

wherein $\nu$ is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8 to 10 mm, the distance between the optical axis of the eye and the side of the head, l, is, typically, between 40 and 80 mm. Consequently, even for a small FOV of 8°, the desired substrate thickness would be of the order of 12 mm.

Methods have been proposed to overcome the above problem. These include, utilizing a magnifying telescope inside the substrate and non-parallel coupling directions. Even with these solutions, however, and even if only one reflecting surface is considered, the system thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T\tan\alpha_{sur} - d_{eye}}{R_{eye}}, \quad (3)$$

wherein $\alpha_{sur}$ is the angle between the reflecting surface and the normal to the substrate plane, and
$R_{eye}$ is the distance between the eye of the viewer and the substrate (typically, about 30-40 mm).

Practically $\tan\alpha_{sur}$ cannot be much larger than 1; hence, for the same parameters described above for a FOV of 8°, the required substrate thickness here is on the order of 7 mm, which is an improvement on the previous limit. Nevertheless, as the desired FOV is increased, the substrate thickness increases rapidly. For instance, for desired FOVs of 15° and 30° the substrate limiting thickness is 18 mm or 25 mm, respectively.

Figure 2:
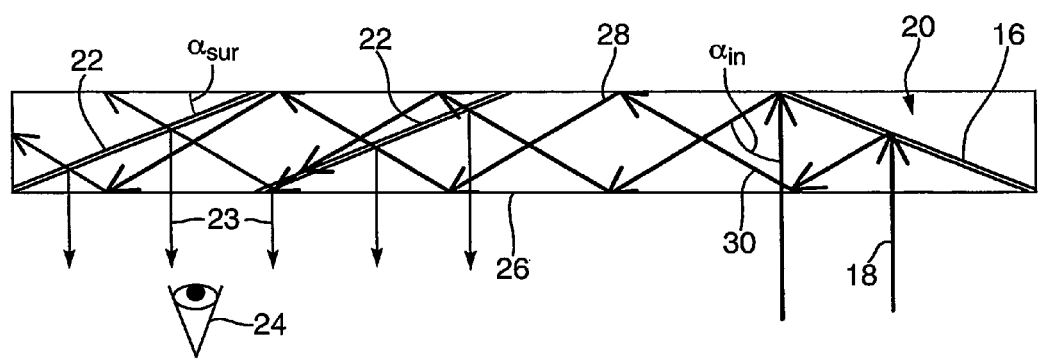

To alleviate the above limitations, the present invention utilizes an array of selectively reflecting surfaces, fabricated within a LOE. FIG. 2 illustrates a sectional view of an LOE according to the present invention. The first reflecting surface 16 is illuminated by a collimated input plane wave 18, emanating from a display light source (not shown) located behind the device, wherein the plane wave 18 is one of a set of light waves located within a given FOV to be coupled into the LOE. The reflecting surface 16 reflects the incident light from the source such that the light is trapped inside a planar substrate 20 by total internal reflection. After several reflections off the surfaces of the substrate, the trapped wave reaches an array of selectively reflecting surfaces 22, which couple the light wave 23 out of the substrate into the EMB 24 of a viewer. For avoiding ghost images, the output light wave 23 should be a plane wave, otherwise, different rays representing a single point at the display source will arrive at the EMB 24 of the viewer at different incident angles and ghost images that interfere with the primary image will be seen by the viewer. In order to prevent this phenomenon, the output light wave 23, and hence the input wave 18, should be plane waves. That is, the angular deviation between two different rays located on the same light wave should be less than $\alpha_{res}$, wherein $\alpha_{res}$ is the angular resolution of the optical device. Usually, for most visual systems, $\alpha_{res}$ is ~1-2 milliradians, but different devices can yield different angular resolutions.

Assuming that the central wave of the source is coupled out of the substrate 20 in a direction normal to the substrate surface 26, and the off-axis angle of the coupled wave inside the substrate 20 is $\alpha_{in}$, then the angle $\alpha_{sur2}$ between the reflecting surfaces and the substrate plane is:

$$\alpha_{sur2} = \frac{\alpha_{in}}{2}. \quad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26, wherein the incident angle $\beta_{ref}$ between the trapped ray and the normal to the reflecting surface is:

$$\beta_{ref} = \alpha_{in} - \alpha_{sur2} = \alpha_{in}/2. \quad (5)$$

The trapped rays arrive at the reflecting surface from the second direction 30 after an odd number of reflections from the substrate surfaces 26, where the off-axis angle is $\alpha'_{in} = 180° - \alpha_{in}$ and the incident angle between the trapped ray and the normal to the reflecting surface is:

$$\beta'_{ref} = \alpha'_{in} - \alpha_{sur2} = 180° - \alpha_{in} - \alpha_{sur2} = 180° - \frac{3\alpha_{in}}{2}. \quad (6)$$

In order to prevent undesired reflections and ghost images, the reflectance for one of these two directions should be negligible. The desired discrimination between the two incident directions can be achieved if one angle is significantly smaller then the other one. It is possible to provide a coating with very low reflectance at high incident angles and a high reflectance for low incident angles. This property can be exploited to prevent undesired reflections and ghost images by eliminating the reflectance in one of the two directions. For example choosing $\beta_{ref}$~25° from Equations (5) and (6) it can be calculated that:

$$\beta'_{ref} = 105°; \alpha_{in} = 50°; \alpha'_{in} = 130°; \alpha_{sur2} = 25°. \quad (7)$$

If now a reflecting surface is determined for which $\beta'_{ref}$ is not reflected but $\beta_{ref}$ is, the desired condition is achieved.

Figure 3A:
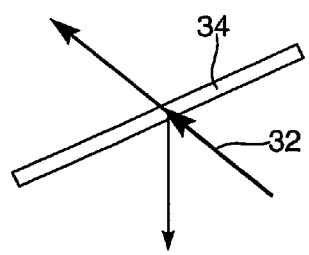
Figure 3B:
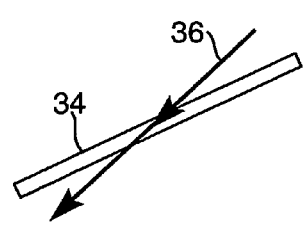

FIGS. 3A and 3B illustrate the desired reflectance behavior of selectively reflecting surfaces. While the ray 32 (FIG. 3A), having an off-axis angle of $\beta_{ref}$~25°, is partially reflected and is coupled out of the substrate 34, the ray 36 (FIG. 3B), which arrives at an off-axis angle of $\beta'_{ref}$~75° to the reflecting surface (which is equivalent to $\beta'_{ref}$~105°), is transmitted through the reflecting surface 34 without any notable reflection.

FIGS. 4 and 5 show the reflectance curves of a dichroic coating designed to achieve the above reflectance characteristics, for four different incident angles: 20°, 25°, 30° and 75°, with P-polarized and S-polarized light respectively. While the reflectance of the high-angle ray is negligible over the entire relevant spectrum, the rays at off-axis angles of 20°, 25° and 30°, obtain almost constant reflectance of 26%, 29% and 32% respectively, for P-polarized light, and 32%, 28% and 25% respectively, for S-polarized light, over the same spectrum. Evidently, reflectance decreases with the obliquity of the incident rays for P-polarized light and increases for S-polarized light.

Figure 6:
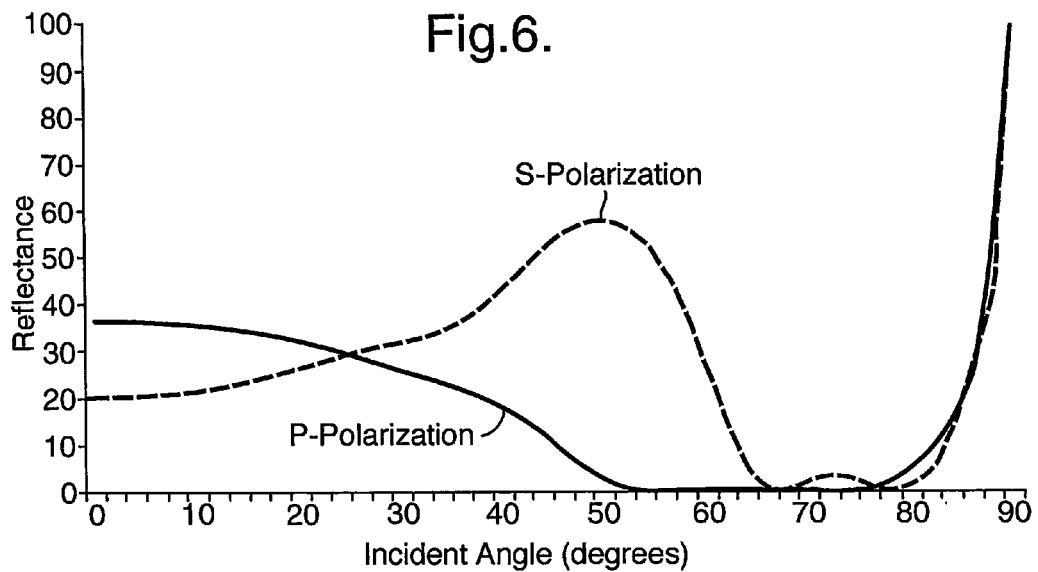

FIG. 6 illustrates the reflectance curves of the same dichroic coating, as a function of the incident angle for both polarizations at wavelength λ=550 nm. There are two significant regions in this graph: between 65° and 80° where the reflectance is very low, and between 15° and 40° where the reflectance changes monotonically with decreasing incident angles (increasing for P-polarized light and decreasing for S-polarized light). Hence, as long as one can ensure that the entire angular spectrum of $\beta'_{ref}$, where very low reflections are desired, will be located inside the first region, while the entire angular spectrum of $\beta_{ref}$, where higher reflections are required, will be located inside the second region, for a given FOV, one can ensure the reflection of only one substrate mode into the eye of the viewer and a ghost-free image.

There are some differences between the behaviors of the two polarizations. The main differences are that the region of high angles, where the reflectance is very low, is much narrower for the S-polarization and that it is much more difficult to achieve a constant reflectance for a given angle over the entire spectral bandwidth for the S-polarized light than for the P-polarized light. Therefore, it is preferable to design the LOE only for the P-polarized light. This would be satisfactory for a system using a polarized display source, such as an LCD, or for a system where the output brightness is not crucial and the S-polarized light can be filtered out. However, for an unpolarized display source, like a CRT or an OLED, or for a system where the brightness is critical, S-polarized light cannot be neglected and it must be taken into account during the design procedure. Another difference is that the monotonic behavior of the S-polarized light at the angular spectrum of $\beta_{ref}$, where higher reflections are required, is opposite to that of the P-polarized light, that is, the reflectance for the S-polarized light increases with the obliquity of the incident rays. This contradictory behavior of the two polarizations at the angular spectrum of $\beta_{ref}$ could be utilized during the optical design of the system to achieve the desired reflectance of the overall light according to the specific requirements of each system.

The reflectance of the first reflecting surface 16 (FIG. 2) should be as high as possible, so as to couple as much light as possible from the display source onto the substrate. Assuming that the central wave of the source is normally incident onto the substrate, i.e., $\alpha_0 = 180°$, then the angle $\alpha_{sur1}$ between the first reflecting surface and the substrate plane is:

$$\alpha_{sur1} = \frac{\alpha_{in}}{2}; \alpha'_{sur1} = \frac{\alpha'_{in}}{2}. \qquad (8)$$

The solutions for $\alpha_{sur1}$ and $\alpha'_{sur1}$ in the above example are 25° and 65°, respectively.

Figure 7:
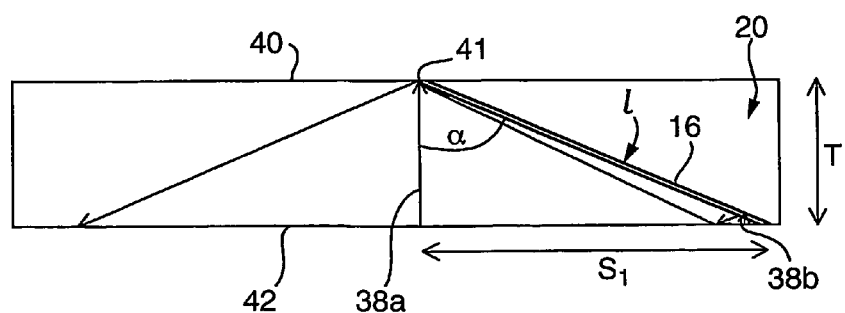

FIG. 7 presents a sectional view of the reflective surface 16, which is embedded inside the substrate 20 and couples light 38 from a display source (not shown) and traps it inside the substrate 20 by total internal reflection. As plotted here, the projection $S_1$ of the reflecting surface on the substrate surface 40 is:

$$S_1 = T \cdot \tan(\alpha), \qquad (9)$$

where T is the substrate thickness.

The solution of $\alpha = \alpha'_{sur1}$ is preferred, since the coupling area on the substrate surface for the above example is more than 4.5 times larger than it is for the previous solutions. A similar improvement ratio holds for other systems. To avoid an image with gaps or stripes, the trapped light should cover the entire area of the LOE. To ensure this, the points on the boundary line 41 between the edge of the reflective surface 16 and the upper surface 40 of the substrate 20 should be illuminated for a single wave by two different rays that enter the substrate in two different locations: a ray 38a that illuminates directly the boundary line 41, and another ray 38b which is first reflected by the reflecting surface 16 and then by the lower surface 42 of substrate before illuminating the boundary line.

Assuming that the coupled wave illuminates the entire area of the reflecting surface, after reflection from the surface 16, it illuminates an area of $2S_1 = 2T \tan(\alpha)$ on the substrate surface. On the other hand, the projection of a reflection surface 22 on the substrate plane, is $S_2 = T \tan(\alpha_{sur2})$. To avoid either overlapping or gaps between the reflecting surfaces, the projection of each surface is adjacent to its neighbor. Hence, the number N of reflecting surfaces 22 through which each coupled ray passes during one cycle (i.e., between two reflections from the same surface of the substrate) is:

$$N = \frac{2S_1}{S_2} = \frac{2T \cdot \cot(\alpha_{sur1})}{T \cdot \cot(\alpha_{sur2})}. \qquad (10)$$

In this example, where $\alpha_{sur2} = 25°$ and $\alpha_{sur1} = 25°$, the solution is N=2; that is, each ray passes through two different surfaces during one cycle.

The embodiment described above with regard to FIG. 8 is an example of a method for coupling the input waves into the substrate. Input waves could, however, also be coupled into the substrate by other optical means, including (but not limited to) folding prisms, fiber optic bundles, diffraction gratings, and other solutions.

Also, in the example illustrated in FIG. 2, the input waves and the image waves are located on the same side of the substrate. Other configurations are envisioned in which the input and the image waves could be located on opposite sides of the substrate. It is also possible, in certain applications, to couple the input waves into the substrate through one of the substrate's peripheral sides.

Figure 8:
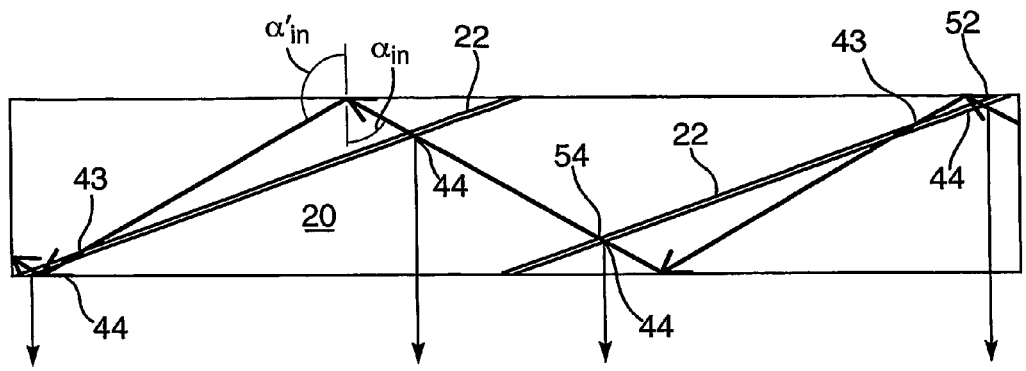

FIG. 8 is a detailed sectional view of an array of selectively reflective surfaces which couple light, trapped inside the substrate, out and into the eye of a viewer. As can be seen, in each cycle the coupled ray passes at 43 through reflecting surfaces 22, at an angle of $\alpha'_{in} = 130°$, whereby the angle between the ray and the normal to the reflecting surfaces is ~75°. The reflections from these surfaces are negligible. In addition, the ray passes twice at 44 through the reflecting surface 22, in each cycle, at an angle of $\alpha_{in} = 50°$, where the incident angle is 25°. Part of the energy of the ray is coupled out of the substrate. Assuming that one array of two selectively reflecting surfaces 22 is used to couple the light onto the eye of a viewer, the maximal FOV is:

$$FOV_{\max} \approx \frac{2T \tan \alpha_{sur1} - d_{eye}}{R_{eye}}, \qquad (11)$$

Hence, for the same parameters of the examples above, the limiting substrate thickness for an FOV of 8° is in the order of 2.8 mm; for FOVs of 15° and 30°, the limiting substrate thickness is 3.7 mm and 5.6 mm, respectively. These are more favorable values than the limiting thickness of the state-of-the-art solutions discussed above. Moreover, more than two selectively reflecting surfaces can be used. For example, for three selectively reflecting surfaces 22, the limiting substrate thickness for FOVs of 15° and 30° is approximately 2.4 mm and 3.9 mm, respectively. Similarly additional reflecting surfaces may be introduces to, amongst other advantages, reduce the limiting optical thickness further.

For embodiments where a relatively small FOV is utilized, a single partially reflecting surface can be sufficient. For example, for a system with the following parameters: $R_{eye} = 25$ mm; $\alpha_{sur} = 72°$ and T=5 mm, a moderate FOV of 17° can be achieved even with a single reflecting surface 22. Part of the rays will cross the surface 22 several times before being coupled out into the desired direction. Since the minimal propagation angle inside the substrate to achieve the total-internal reflection condition for BK7 material or similar is $\alpha_{in(min)} = 42°$, the propagation direction of the central angle of the FOV is $\alpha_{in(cen)} = 48°$. Consequently, the projected image is not normal to the surface but is rather inclined to 12° off-axis. Nevertheless, for many applications this is acceptable.

Figure 9:
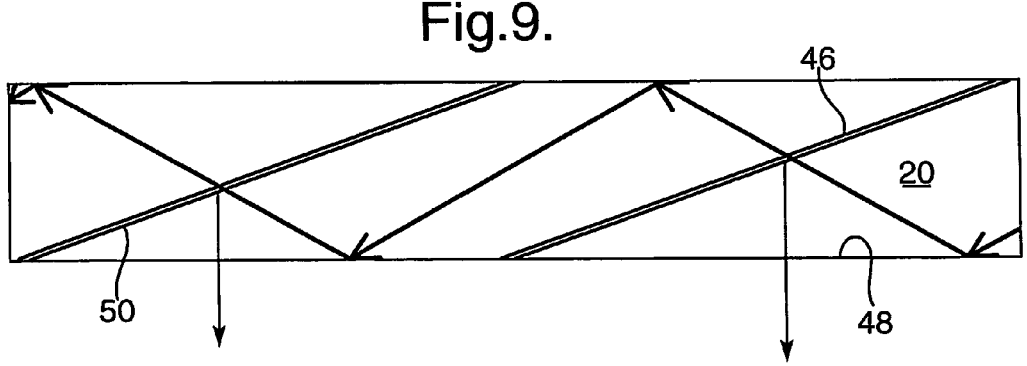

As illustrated in FIG. 9, each selectively reflecting surface is illuminated by optical rays of different intensities. While the right surface 46 is illuminated by rays immediately after they are reflected from the lower face 48 of the substrate 20, the left surface 50 is illuminated by rays that have already passed through the partially reflecting surface 46 and therefore have a lower intensity. To achieve images of uniform brightness, compensation is required for the differences in intensities between the different portions of the image. Indeed, coating the reflecting surfaces with different coatings, whereby the reflectance of surface 46 is lower than the reflectance of surface 50 compensates for the uneven illumination.

Another potential non-uniformity in the resulting image might occur due to the different reflection sequences of different rays that reach each selectively reflecting surface:— some rays arrive directly without a reflection from a selectively reflecting surface; other rays arrive after one or more such reflections. This effect is illustrated in FIG. 8. A ray intersects the first selectively reflecting surface 22 at the point 52. The incident angle of the ray is 25° and a portion of the ray's energy is coupled out of the substrate. The ray then intersects the same selectively reflecting surface at point 43 at an incident angle of 75° without noticeable reflection, and then intersects again at point 54 at an incident angle of 25° where another portion of the ray's energy is coupled out of the substrate. In contrast the ray shown in FIG. 10, undergoes only one reflection from the same surface. A greater number of multiple reflections occur at smaller incident angles. Therefore, one method to compensate for non-uniformity that results from such multiple-intersections, is to provide a coating where the reflectance increases monotonically with decreasing incident angle, as shown in FIG. 5 for the reflectivity in the range of 10 to 40°. It is difficult to fully compensate for such differences in multiple-intersection effects. Nevertheless, in practice, the human eye tolerates significant variations in brightness which remain unnoticed. For near-to-eye displays, the eye integrates all the light which emerges from a single viewing angle and focuses it onto one point on the retina, and since the response curve of the eye is logarithmic, small variations, if any, in the display's brightness will not be noticeable. Therefore, even for moderate levels of illumination uniformity within the display, a human eye experiences a high-quality image. The required moderate uniformity can readily be achieved with an LOE.

Figure 10:
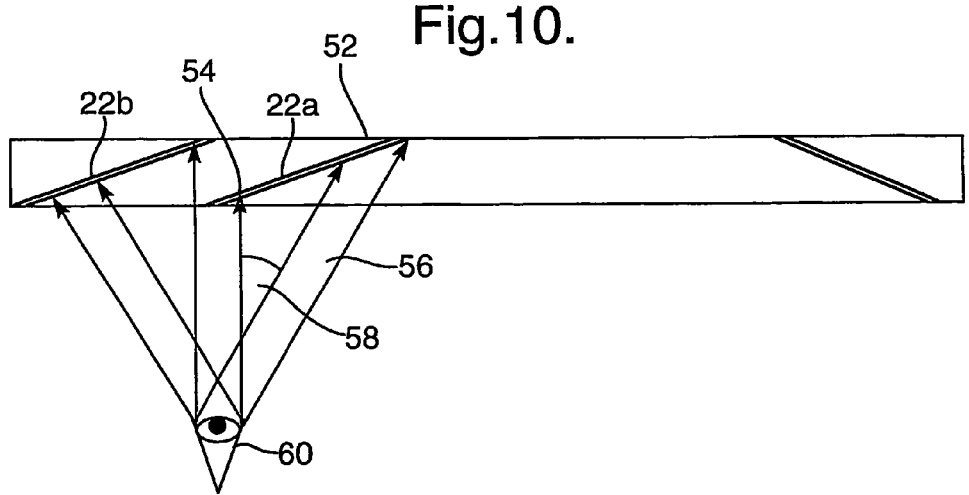

For displays located at a distance from the eye, however, like HUD's, the non-uniformity due to the multiple intersection effects cannot be tolerated. For these cases, a more systematic method to overcome the non-uniformity is required. The potential non-uniformity problem is particularly crucial when the active area of the LOE is comparatively large and the number of the partially reflecting surfaces is small. For instance, as illustrated in FIG. 10 an LOE with two reflecting surfaces can be designed even for a system with a large area. In such a case, coating the reflecting surfaces 22 with different coatings, whereby the reflectance of surface 46 is lower than the reflectance of surface 50 (see FIG. 9) does not fully compensate for the uneven illumination. A possible solution is to use a non-uniform reflecting coating for each one of the partially reflecting surfaces, to compensate for the non-uniformity and to achieve an image of uniform brightness over the entire FOV. The simplest correction method is to set, for each reflecting surface, the reflectance to increase monotonically along the propagation direction of the trapped rays. This increase can be either continuous or gradual. For instance, as illustrated in FIG. 8, the reflectance at point 54 is higher than at point 52. However, more accurate constructional methods can be applied.

In considering the viewing angles, it is noted that different portions of the resulting image emerge from different portions of the partially reflecting surfaces. FIG. 10, which shows a sectional view of a compact LOE display system based on the proposed embodiment, illustrates this effect. Here, a single plane wave 56, representing a particular viewing angle 58, illuminates only part of the overall array of partially reflecting surfaces 22. Thus, for each point on the partially reflecting surface, a nominal viewing angle is defined, and the reflectance is designed according to this angle.

The design of the coatings of the various partially reflecting surfaces of the LOE is performed as follows: For each particular angle, a ray is plotted (taking into account the refraction due to Snell's law) from the center of the designated eye pupil 60 to the partially reflecting surface. The calculated direction is set as the nominal incident direction and the particular coating is designed according to that direction, taking into account prior reflectance related to this particular viewing angle. In addition, the coating in each section of the reflecting surface is set to minimize the influence of this section on the rays that should not be reflected out in this particular section. Hence, for each viewing angle, the average reflectance from the relevant surfaces will be very close to the desired reflectance.

Figure 11:
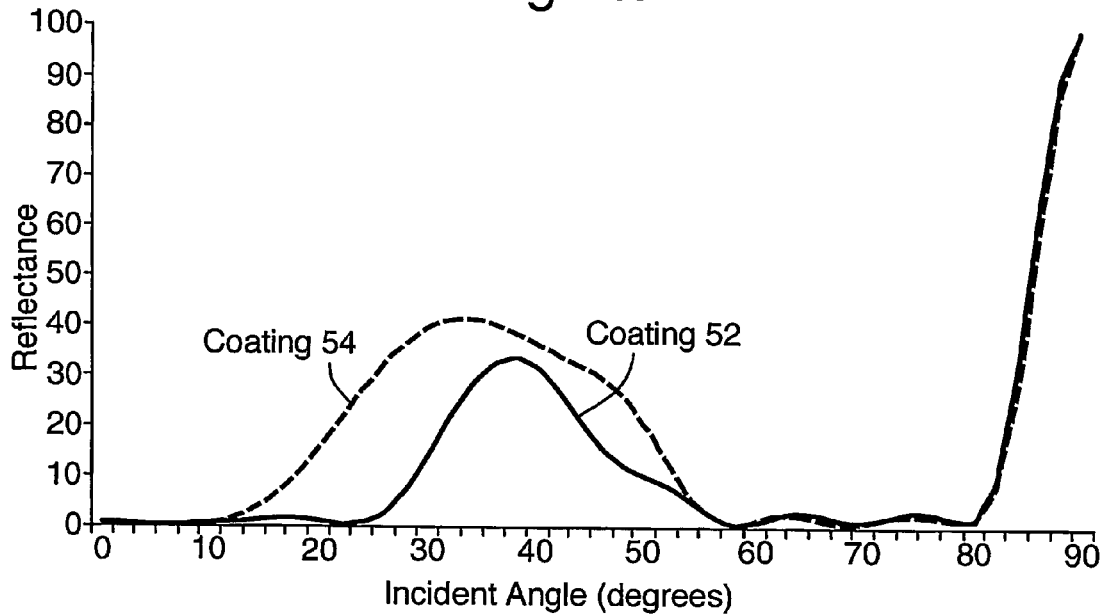

FIG. 11 illustrates two different sections of the first reflecting surface 46 (FIG. 9) having two different reflectance curves. Assuming that the designated reflecting angles for points 52 and 54 (FIG. 8) are 35° and 25° respectively, and that the required reflectance for both angles is 30%, it is desired that the reflectance of the first section of rays with a 25° incident angle is minimized. Therefore, as illustrated in FIG. 11, reflectance at point 52 is 30% and ~0% at the incident angles of 35° and 25° respectively, while the reflectance at point 54 is 30% and ~0% at the incident angles of 25° and 15° respectively. Naturally, the reflectance curve of the coating can be changed either gradually or continuously as a function of the lateral axis in this case as well.

Thus far, only the FOV along the $\xi$ axis has been discussed. The FOV along the orthogonal $\eta$ axis should also be considered. The FOV along the $\eta$ axis is not dependent upon the size or number of the selectively reflecting surfaces, but rather, on the lateral dimension along the $\eta$ axis of the input waves coupled into the substrate. The maximum achievable FOV along the $\eta$ axis is:

$$FOV_{max} \approx \frac{D_\eta - d_{eye}}{R_{eye} + l/(v \sin \alpha_{in})}, \quad (12)$$

wherein $D_\eta$ is the lateral dimension along $\eta$ axis of the input waves coupled into the substrate.

That is, if the desired FOV is 30°, then by using the same parameters described above, the limiting lateral dimension is 42 mm. It was previously demonstrated that the longitudinal dimension along the $\xi$ axis of the input waves coupled into the substrate is given by $S_1=T \tan(\alpha_{in})$. A substrate thickness of T=4 mm yields $S_1$=8.6 mm. Seemingly, the lateral extent of the LOE is fivefold larger than the longitudinal dimension. Even for an image aspect ratio of 4:3 (as with a standard video display) and the FOV in the $\eta$ axis is 22°, the required lateral dimension is approximately 34 mm, still four-fold larger than the longitudinal dimension. This asymmetry is problematic:—a collimating lens with a high numerical aperture, or a very large display source are required. In any case, with such numerical values dimensions, it is impossible to achieve the desired compact system.

FIG. 12 illustrates an alternative method to expand the beam along both axes utilizing a double LOE configuration. The input wave is coupled into the first LOE 20a by the first reflecting surface 16a and then propagating along the $\xi$ axis. The partially reflecting surfaces 22a couple the light out of LOE 20a into the second LOE 20b by the reflecting surface 16b. The light is then propagated along the $\eta$ axis, and then coupled out by the selectively reflecting surfaces 22b. As shown, the original beam is expanded along both axes where the overall expansion is determined by the ratio between the lateral dimensions of the elements 16a and 22b respectively. The embodiment illustrated in FIG. 12 is just an example of a double-LOE setup. Other configurations where two or more LOEs are combined together to form complicated optical systems are also possible. For example, three different substrates, the coating of each being designed for one of the three basic colors, can be combined to produce a three-color display system. In that case, each substrate is transparent with respect to the other two colors. Such a system can be useful for applications in which a combination of three different monochromatic display-sources is required in order to create the final image. There are many other examples in which several substrates can be combined together to form a more complicated system.

In general, all the different configurations of the light-guide optical elements considered above, offer several important advantages over alternative compact optics for display applications, which include:
1) The input display source can be located very close to the substrate, so that the overall optical system is very compact and lightweight, offering an unparalleled form-factor.
2) In contrast to other compact display configurations, the present invention offers flexibility as to location of the input display source relative to the eyepiece. This flexibility, combined with the ability to locate the source close to the expanding substrate, alleviates the need to use an off-axis optical configuration that is common to other display systems. In addition, since the input aperture of the LOE is much smaller than the active area of the output aperture, the numerical aperture of the collimating lens 6 (FIG. 1) is much smaller than required for a comparable conventional imaging system. Consequently a significantly more convenient optical system can be implemented and the many difficulties associated with off-axis optics and high numerical-aperture lenses, such as field or chromatic aberrations can be compensated for relatively easily and efficiently.
3) The reflectance coefficients of the selectively reflective surfaces in the present invention are essentially identical over the entire relevant spectrum. Hence, both monochromatic and polychromatic, light sources may be used as display sources. The LOE has a negligible wavelength-dependence ensuring high-quality color displays with high resolutions.
4) Since each point from the input display is transformed into a plane wave that is reflected into the eye of the viewer from a large part of the reflecting array, the tolerances on the exact location of the eye can be significantly relaxed. As such, the viewer can see the entire field-of-view, and the eye-motion-box can be significantly larger than in other compact display configurations.
5) Since a large part of the intensity from the display source is coupled into the substrate, and since a large portion of this coupled energy is "recycled" and coupled out into the eye of the viewer, a display of comparatively high brightness can be achieved even with display sources with low power consumption.

FIG. 13 illustrates an embodiment of the present invention in which the LOE 20 is embedded in an eye-glasses frame 68. The display source 4, the collimating lens 6, and the folding lens 70 are assembled inside the arm portions 72 of the eye-glasses frame, just next to the edge of the LOE 20. For a case in which the display source is an electronic element such as a small CRT, LCD, or OLED, the driving electronics 74 for the display source might be assembled inside the back portion of the arm 72. A power supply and data interface 76 is connectable to arm 72 by a lead 78 or other communication means including radio or optical transmission. Alternatively, a battery and miniature data link electronics can be integrated in the eye-glasses frame.

The embodiment described above can serve in both see-through and non-see-through systems. In the latter case opaque layers are located in front of the LOE. It is not necessary to occlude the entire LOE, typically only the active area, where the display is visible needs to be blocked. As such, the device can ensure that the peripheral vision of the user is maintained, replicating the viewing experience of a computer or a television screen, in which such peripheral vision serves an important cognitive function. Alternatively, a variable filter can be placed in front of the system in such a way that the viewer can control the level of brightness of the light emerging from the external scene. This variable filter could be either a mechanically controlled device such as a folding filter, or two rotating polarizers, an electronically controlled device, or even an automatic device, whereby the transmittance of the filter is determined by the brightness of the external background. One method to achieve the required variable transmittance filter is to use electrochromic materials in order to provide electrical control of optical transmittance, wherein materials with electrically controllable optical properties are incorporated into laminated structures.

There are some alternatives as to the precise way in which an LOE can be utilized in this embodiment. The simplest option is to use a single element for one eye. Another option is to use an element and a display source for each eye, but with the same image. Alternatively it is possible to project two different parts of the same image, with some overlap between the two eyes, enabling a wider FOV. Yet another possibility is to project two different scenes, one to each eye, in order to create a stereoscopic image. With this alternative, attractive implementations are possible, including 3-dimensional movies, advanced virtual reality, training systems and others.

The embodiment of FIG. 13 is just an example illustrating the simple implementation of the present invention. Since the substrate-guided optical element, constituting the core of the system, is very compact and lightweight, it could be installed in a vast variety of arrangements. Hence, many other embodiments are also possible including a visor, a folding display, a monocle, and many more. This embodiment is designated for applications where the display should be near-to-eye: head-mounted, head-worn or head-carried.

The embodiment described above is a mono-ocular optical system, that is, the image is projected onto a single eye. There are, however, applications, such as head-up displays (HUD), wherein it is desired to project an image onto both eyes. Until recently, HUD systems have been used mainly in advanced combat and civilian aircraft. There have been numerous proposals and designs, of late, to install a HUD in front of a car driver in order to assist in driving navigation or to project a thermal image into his eyes during low-visibility conditions. Current aerospace HUD systems are very expensive, the price of a single unit being in the order of hundreds of thousands of dollars. In addition, the existing systems are very large, heavy, and bulky, and are too cumbersome for installation in a small aircraft let alone a car. LOE-based HUD potentially provide the possibilities for a very compact, self-contained HUD, that can be readily installed in confined spaces. It also simplifies the construction and manufacturing of the optical systems related to the HUD and therefore is a potentially suitable for both improving on aerospace HUD's, as well as introducing a compact, inexpensive, consumer version for the automotive industry.

FIG. 14 illustrates a method of materializing an HUD system based on the present invention. The light from a display source 4 is collimated by a lens 6 to infinity and coupled by the first reflecting surface 16 into substrate 20. After reflection at a second reflecting array (not shown), the optical waves impinge on a third reflecting surfaces 22, which couples the light out into the eyes 24 of the viewer. The overall system can be very compact and lightweight, of the size of a large postcard having a thickness of a few millimeters. The display source, having a volume of a few cubic centimeters, can be attached to one of the corners of the substrate, where an electric wire can transmit the power and data to the system. It is expected that the installation of the presented HUD system will not be more complicated than the installation of a simple commercial audio system. Moreover, since there is no need for an external display source for image projection, the necessity to install components in unsafe places is avoided.

Since the exit pupil of a typical HUD system is much larger than that of a head-mounted system, it is expected that a double-LOE configuration, as described above with reference to FIG. 12, will be needed to achieve the desired FOV There may be some special cases, however, including systems with small vertical FOVs, or with a vertical LED array as a display source, in which a single-LOE configuration would suffice.

The embodiments illustrated in FIG. 14 can be implemented for other applications, in addition to HUD systems for vehicles. One possible utilization of these embodiments is as a flat display for a computer or television. The main unique characteristic of such a display is that the image is not located at the screen plane, but is focused at infinity or to a similarly convenient distance. One of the main drawbacks of existing computer displays is that the user has to focus his eyes at a very close distance of between 40 and 60 cm, while the natural focus of a healthy eye is to infinity. Many people suffer from headaches after working for a long duration of time at a computer. Many others who work frequently with computers tend to develop myopia. In addition, some people, who suffer from both myopia and hyperopia, need special spectacles for work with a computer. A flat display, based on the present invention, could be an appropriate solution for people who suffer from the above-described problems and do not wish to work with a head-mounted display. Furthermore, the present invention allows for a significant reduction in the physical size of the screen. As the image formed by the LOE is larger than the device, it Would be possible to implement large screens on smaller frames. This is particularly important for mobile applications such as lap and palm-top computers.

Yet another possible implementation of this embodiment is as a screen for a personal digital assistance (PDA). The size of the existing conventional screens presently used, is under 10 cm. Since the minimal distance where these displays can be read is in the order of 40 cm, the obtainable FOV is under 15°, hence, the information content, especially as far as text is concerned, on these displays is limited. A significant improvement in the projected FOV can be made with the embodiment illustrated in FIG. 10. The image is focused at infinity, and the screen can be located much closer to the eyes of the viewer. In addition, since each eye sees a different part of the total filed-of-view (TFOV), with an overlap at its center, another increase in the TFOV may be achieved. Therefore, a display with an FOV of 40° or larger is feasible.

In all of the embodiments of the invention described above, the image transmitted by the LOE is focused to infinity. However, there are applications or users where the transmitted image should be focused to a closer distance, for example, for people who suffer from myopia and cannot see properly images located at long distances. FIG. 15 illustrates a method for implementing a lens, based on the present invention. An image 80 from infinity is coupled into a substrate 20 by a reflecting surface 16 and then reflected by an array of partially reflective surfaces 22 into the eye 24 of the viewer. The ophthalmic lens 82 focuses the images to a convenient distance and optionally corrects other aberrations of the viewer's eye, including astigmatism. The plano-concave lens 82 can be attached to the surface of the substrate at its flat surface. However, a thin air gap 84 must be preserved between the lens and the substrate to ensure the trapping of the image rays inside the substrate by total internal reflection.

In addition, in all of the embodiments of the invention described above, it is assumed that the external scene is located at infinity. However, there are applications, such as for professional or medical stuff, where the external scene is located at closer distances. FIG. 16 illustrates a method for implementing dual lens configuration, based on the present invention. An image 80 from infinity is coupled into a substrate 20 by a reflecting surface 22 and then reflected by an array of partially reflective surfaces 22 into the eye 24 of the viewer. Another scene image 86 from a close distance is collimated to infinity by a lens 88 and then passed through the substrate 20 into the eye. The lens 82 focuses images 80 and 86 to a convenient distance, usually the original distance of the external scene 86, and corrects other aberrations of the viewer's eye, if required.

The lenses 82 and 88 which are plotted in FIGS. 15 and 16 are simple plano-concave and piano-convex lenses respectively. However, to keep the planar shape of the LOE it is possible to utilize instead Fresnel lenses, which can be made of thin molded plastic plates with fine steps. Moreover, an alternative way to materialize the lenses 82 or 88, instead of as fixed lenses as described above, is to exploit electronically controlled dynamic lenses. There are applications where it is required that the user will be able not only to see a non-collimated image but also to control dynamically the focus of the image. Recently, it has been shown that a high resolution, spatial light modulator (SLM) can be used to form a holographic element. Presently, the most popular sources for that purpose are LCD devices, but other dynamic SLM devices can be used as well. High resolution, dynamic lenses having several hundred lines/mm are known. This kind of electro-optically controlled lenses can be used as the desired dynamic elements in the present invention, instead of the fixed lenses described above in conjunction with FIGS. 15 and 16. Therefore, the operator can determine and set, in real time, the exact focal planes of both the virtual image projected by the LOE and the real image of the external view.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising:
    a light-transmitting substrate having at least two major surfaces parallel to each other and edges and at least one partially reflecting surface located in the substrate which is not parallel to a major surface of the substrate;
    a display light source emitting collimated light waves located in a given field of view; and
    at least one optical element for coupling light waves from the display light source into the substrate by total internal light wave reflection, the optical element having at least one plane surface disposed at an angle to a major surface of the substrate;
    wherein a single point on a boundary line between the edge of the plane surface and one of the major surfaces of the substrate is illuminated by two different light rays from one of the collimated light waves from the display light source that enter the substrate in two different locations and are trapped inside the substrate by total internal reflection, the trapped light wave covering the entire area of the substrate.

2. The optical device according to claim 1, wherein the optical element is disposed at an angle to major surfaces of the substrate to cause one of the rays to illuminate directly the boundary line, and a second of the rays to be reflected first by the other of the major surfaces of the substrate before illuminating the boundary line.

3. The optical device according to claim 1, wherein said at least one partially reflecting surface couples the collimated light waves trapped by internal reflection out of said substrate.

4. The optical device according to claim 1, wherein collimated light waves located in said field-of view reach an eye of an observer.

5. The optical device according to claim 1, wherein the reflectance of the at least one plane surface, changes monotonically along the plane surface of the optical element.

6. The optical device according to claim 1, wherein the reflectance of the at least one partially reflecting surface, changes gradually along the plane surface of the optical element.

7. The optical device according to claim 1, wherein the reflectance of the at least one partially reflecting surface, changes continuously along the plane surface of the optical element.

8. The optical device according to claim 1, wherein the reflectance of the at least one partially reflecting surface produces a field of view having uniform brightness.

9. The optical device according to claim 1, wherein the reflectance of the at least one partially reflecting surface produces a field of view having a predefined brightness.

10. The optical device according to claim 1, wherein the display light source is a liquid crystal display.

11. The optical device according to claim 1, wherein the display light source is an organic light emitting diode display.

12. The optical device according to claim 1, wherein the display light source is a virtual retinal display.

13. The optical device according to claim 10, wherein the display light source is a liquid crystal display light source operating in such a way that the Fourier transform of a desired image is formed on the plane of the liquid crystal display.

14. The optical device according to claim 1, wherein the substrate is partially transparent, to enable see-through operation.

15. The optical device according to claim 1, further comprising an opaque surface located on or in the substrate, so as to block the entrance of light traversing the substrate from an external scene.

16. The optical device according to claim 1, further comprising a variable transmittance surface located so as to attenuate the entrance of light traversing the substrate, for controlling the brightness of light passing through the device from an external scene.

17. The optical device according to claim 16, wherein the transmittance of the variable transmittance surface is determined according to the brightness of light directed to traverse the substrate.

18. The optical device according to claim 1, wherein the at least one partially reflecting surface reflects trapped light waves into a direction calculated to reach both eyes of an observer.

19. The optical device according to claim 1, wherein the device is mounted in an eyeglasses frame.

20. The optical device according to claim 1, wherein the device is located in a head-up-display.

21. The optical device according to claim 1, further comprising a lens located next to one of the major surfaces of the substrate.

22. The optical device according to claim 21, wherein the lens is an ophthalmic lens designed to correct aberrations of a viewer's eye.

23. The optical device according to claim 1, further comprising a collimating lens located next to the second of the major surfaces of the substrate.

24. The optical device according to claim 23, wherein the collimating lens is a focusing lens designed to focus a collimating image to a predefined distance.

25. The optical device according to claim 23, wherein the lens is a Fresnel lens.

26. The optical device according to claim 23, wherein the lens is a dynamic lens.

27. The optical device according to claim 26, wherein the dynamic lens is electronically controlled.

28. The optical device according to claim 24, wherein the collimating lens is a Fresnel lens.

29. The optical device according to claim 24, wherein the collimating lens is a dynamic lens.

30. The optical device according to claim 29, wherein the dynamic lens is electronically controlled.

31. An optical device comprising:
  a light transmitting substrate having at least two major surfaces parallel to each other and edges and at least one partially reflecting surface located in the substrate which is not parallel to a major surface of the substrate;
  a display light source emitting collimated light waves located in a given field-of-view; and
  at least one optical element for coupling light waves from the display light source into the substrate by total internal light wave reflection, the optical element having at least one plane surface disposed at an angle to a major surface of the substrate;
  wherein a single point on the boundary line between the edge of the plane surface and one of the major surfaces of the substrate, is illuminated by two different rays from one of the collimated light waves from the display light source that enter the substrate in two different locations and are trapped inside the substrate by total internal reflection such that the trapped light wave contiguously covers the major surfaces of the substrate without forming gaps or stripes.

* * * * *